(12) United States Patent
Kilian

(10) Patent No.: US 8,292,277 B2
(45) Date of Patent: Oct. 23, 2012

(54) METHODS AND SYSTEMS FOR WORKPIECE HANDLING

(75) Inventor: Friedrich Kilian, Leonberg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1044 days.

(21) Appl. No.: 12/250,687

(22) Filed: Oct. 14, 2008

(65) Prior Publication Data

US 2009/0079120 A1    Mar. 26, 2009

Related U.S. Application Data

(63) Continuation of application No. PCT/EP2007/003461, filed on Apr. 20, 2007.

(30) Foreign Application Priority Data

Apr. 28, 2006  (DE) .......................... 10 2006 019 767

(51) Int. Cl.
*B25B 11/00* (2006.01)

(52) U.S. Cl. ............................................. 269/21; 269/20

(58) Field of Classification Search .................... 269/21, 269/20, 289 R
See application file for complete search history.

(56) References Cited

U.S. PATENT DOCUMENTS

| | | | | |
|---|---|---|---|---|
| 5,433,657 | A * | 7/1995 | Bovone | 451/388 |
| 5,704,599 | A * | 1/1998 | Slothower | 269/21 |
| 2009/0057971 | A1 * | 3/2009 | Bumgarner et al. | 269/21 |
| 2009/0079120 | A1 * | 3/2009 | Kilian | 269/21 |
| 2009/0309283 | A1 * | 12/2009 | Blick et al. | 269/259 |

FOREIGN PATENT DOCUMENTS

| | | |
|---|---|---|
| DE | 3637567 | 5/1988 |
| DE | 19703505 | 10/1997 |
| DE | 10324272 | 3/2005 |
| DE | 102004016637 | 10/2005 |
| FR | 2561221 | 9/1985 |
| JP | 5177478 A | 7/1993 |
| JP | 8018287 A | 1/1996 |

OTHER PUBLICATIONS

Preliminary Report on Patentability for corresponding PCT Application No. PCT/EP2007/003461, mailed Nov. 6, 2008, 7 pages.
English translation of Notification of Reasons for Refusal from corresponding Japanese Application No. 2009-506956, mailed Oct. 27, 2011, 7 pages.
Office Action from corresponding Chinese Patent Application No. 200780015198.9, mailed Dec. 14, 2010, along with English translation, 12 pages.
International Search Report from corresponding PCT Application No. PCT/EP2007/003461, published Jul. 25, 2007, 8 pages.

* cited by examiner

*Primary Examiner* — Lee D Wilson
(74) *Attorney, Agent, or Firm* — Fish & Richardson P.C.

(57) ABSTRACT

In the course of a method for handling a workpiece having at least one through-opening, at least one suction element and the workpiece are placed against each other to form a suction chamber. A vacuum is generated in the suction chamber in order to fix the workpiece and the suction element to each other with a holding force for subsequent manipulation of the workpiece. The workpiece and the suction element are fixed to each other with a holding force by at least partially providing at least one through-opening of the workpiece opening into the suction chamber with a covering in order to reduce the flow of air through the through-opening to the suction chamber after the vacuum has been generated. A workpiece handling system is used to carry out the above-mentioned method.

14 Claims, 4 Drawing Sheets

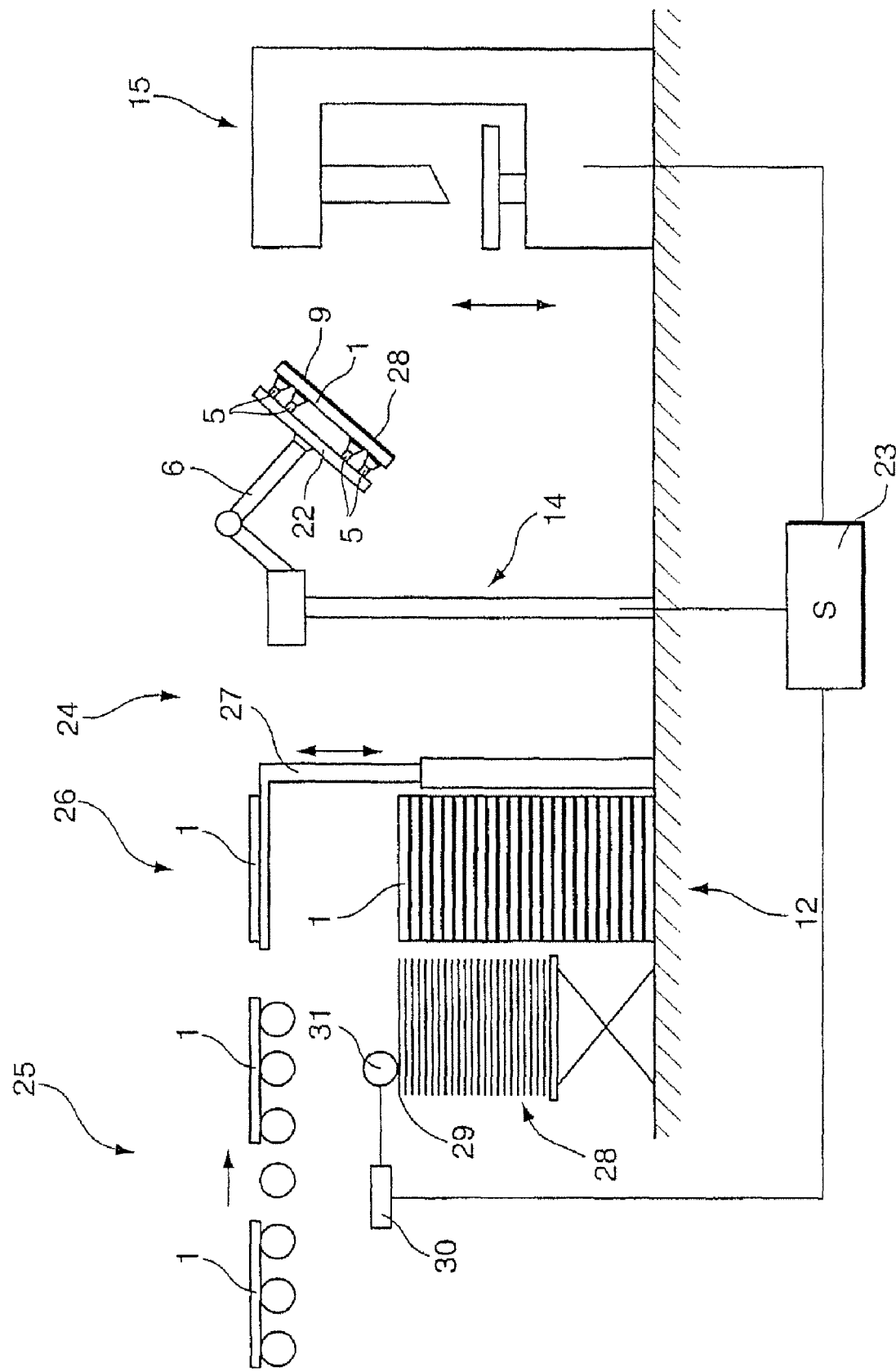

METHODS AND SYSTEMS FOR WORKPIECE HANDLING

RELATED APPLICATIONS

This application is a continuation of, and claims priority under 35 U.S.C. §120 to PCT/EP2007/003461, filed on Apr. 20, 2007, and designating the U.S., and claims priority under 35 U.S.C. §119 from German application 10 2006 019 767.4, filed Apr. 28, 2006. Both of these priority applications are hereby incorporated by reference in their entirety.

TECHNICAL FIELD

The invention relates to methods and systems for handling workpieces, and particularly for handling workpieces having at least one through-opening.

BACKGROUND

Methods and systems that use suction pick-up devices to manipulate workpieces are frequently used in the processing of sheet metal. In that application, metal sheets have to be fed, for example, from a stack of metal sheets to a processing machine. For this, at least one suction element is applied to the uppermost metal sheet in the stack of metal sheets to form a suction chamber. By generating a vacuum in the suction chamber, the metal sheet and the suction element are fixed to each other. The fixed metal sheet can then be fed, for example by means of a manipulator carrying the suction element, to a sheet metal processing machine. The metal sheets to be handled often have a plurality of through-openings. If a suction element is applied to such a perforated metal sheet, it may be that at least one through-opening opens into the suction chamber so formed. On applying a vacuum to the suction chamber, it is not possible in that case to form in the suction chamber a vacuum sufficient to securely fix the workpiece and the suction element to each other.

DE 36 37 567 describes a method in which a plurality of suction elements are applied to a workpiece having through-openings. By means of a shut-off device of the individual suction elements, only those suction elements which are not situated over a through-opening are connected to a vacuum source. Even with a vacuum generator of conventional capacity, therefore, a sufficient vacuum will be generated at least in the suction chambers situated over a closed surface of the workpiece. The use of this method is generally restricted, however, to workpieces having sufficiently large regions without any through-openings.

SUMMARY

In one aspect, the invention features a method for handling a workpiece having at least one through-opening. The method includes providing at least one through opening of the workpiece with a covering, placing at least one suction element and the workpiece against each other, and drawing a vacuum in the suction chamber to fix the workpiece and the suction element to each other with a holding force for subsequent manipulation of the workpiece. The covering is configured to reduce the flow of air through the through-opening to the suction chamber sufficiently so that the vacuum gives rise to the holding force.

Thus, at least one through-opening of the workpiece opening into a suction chamber is at least partially provided with a covering in order to reduce the flow of air through the through-opening to the suction chamber after a vacuum has been generated in the suction chamber. This ensures that a vacuum sufficient to fix the workpiece and the suction element to each other with a holding force is generated in the suction chamber. By means of the covering of the through-opening, the flowing of air through the through-opening into the suction chamber after a vacuum has been generated in the suction chamber can be adequately avoided. The workpiece thus remains securely fixed to the suction element during subsequent manipulation of the workpiece. The at least one through-opening of the workpiece may be provided with the covering either on the side of the workpiece towards the suction element or on the side of the workpiece remote from the suction element, or on both sides.

In some implementations, the method is used to handle a flat workpiece. In such cases, when configuring or applying the covering it is not necessary to take a particular shape of the workpiece surface into consideration. The methods disclosed herein serve especially advantageously for handling a perforated metal sheet. A perforated metal sheet is a metal sheet having a plurality of through-openings perpendicular to the principal plane of the workpiece.

In some implementations, the covering is detachably joined to the workpiece. Accordingly, the covering can be removed from the workpiece, e.g., after processing. An especially simple and flexible method is obtained if the covering is adhesively bonded to a side of the workpiece.

The through-opening can be provided with a planar covering. A planar covering has the advantage that it is able to cover a large region of a side of the workpiece, and hence where applicable a large number of through-openings, while requiring little space. If a film is used as the planar covering, it additionally has the advantage that it can be fitted flexibly to the workpiece.

In a variant that saves on material, only that region of the workpiece to which the suction elements are applied is provided with a covering. Alternatively, a side of the workpiece can be substantially completely provided with a covering.

In the case of workpieces arranged in stacked form, the at least one through-opening of a workpiece can be at least partially provided with the covering during stacking. This can be done in an especially simple manner by alternately stacking the workpieces with intermediate layers serving as coverings. In the case where the workpieces are provided in stacked form without coverings, the at least one through-opening of the workpiece can be at least partially provided with a covering before or during or after destacking of the workpiece. For example, the uppermost workpiece on a stack can first be provided with a covering on the upper side of the workpiece in order for the workpiece to be subsequently taken up by suction and removed from the stack with greater reliability. For reasons of time it may also be advantageous to provide the workpiece with the covering at the same time as it is being pushed off the stack. Alternatively, the workpiece may be removed from the stack, for example by an ejection unit, before it is provided with a covering. In that case, the workpiece is more accessible for application of the covering.

On subsequently being manipulated following the fixing of the suction element and workpiece to each other, the workpiece provided with a covering can be fed to a processing device. In this case, the covering may advantageously serve to enable the workpiece to be processed while also protecting the workpiece is protected from undesirable adverse effects, such as scratches or impressions.

In some implementations, the mechanical arrangement includes a covering unit configured to provide the at least one through-opening at least partially with a covering. The level of automation of the mechanical arrangement is thereby increased. The covering unit may be disposed at a destacking unit. This results in a compact mechanical arrangement for handling workpieces.

The details of one or more embodiments of the invention are set forth in the accompanying drawings and the description below. Other features and advantages of the invention will be apparent from the description and drawings, and from the claims.

DESCRIPTION OF DRAWINGS

FIG. 4 is a schematic illustration of a second mechanical arrangement for handling a workpiece.

DETAILED DESCRIPTION

Figure 1:
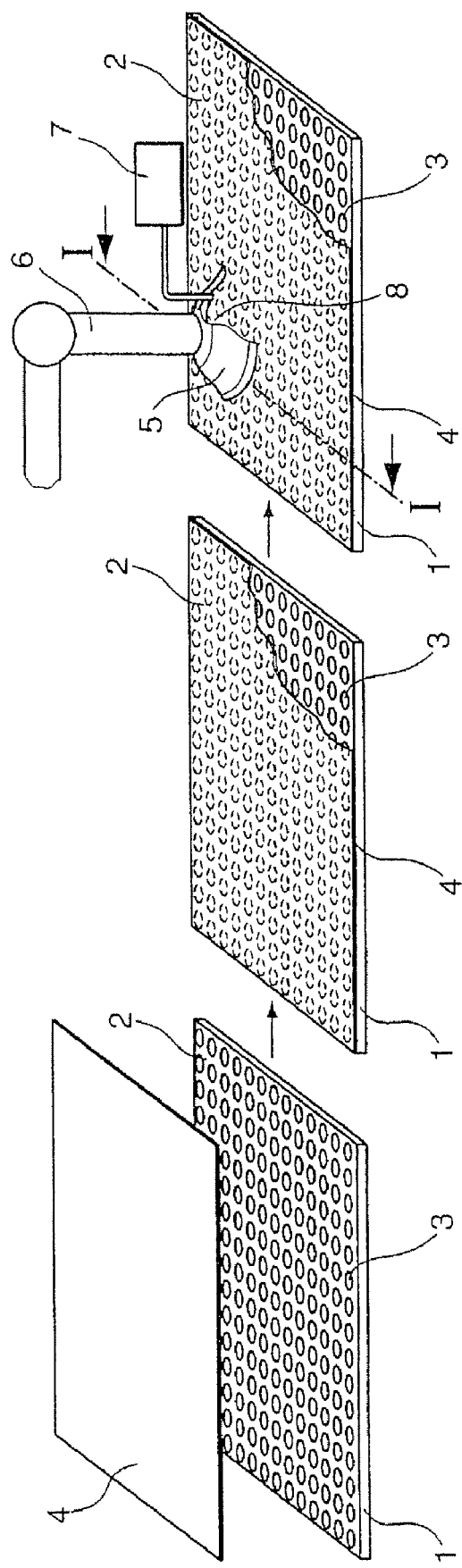
FIG. 1 is a schematic illustration of a method for handling a workpiece with the aid of a suction element.

FIG. 1 shows a workpiece in the form of a perforated metal sheet 1. The perforated metal sheet 1 is a flat workpiece, that is to say, a workpiece with a flat upper side 2. The perforated metal sheet 1 has a plurality of through-openings 3 perpendicular to the principal plane of the workpiece. The workpiece upper side 2 does not have any relatively large regions without through-openings 3.

A covering in the form of a film 4 is adhesively bonded to the workpiece upper side 2 of the perforated metal sheet 1. The film 4 consists of a substantially air-impermeable plastics material. The form and composition of the covering may in principle, however, be adapted to the particular requirements. It is merely necessary to ensure that the flow of air through the through-openings 3 can be reduced by means of the covering. One inexpensive variant is a covering of paper.

In the case illustrated, the film 4 covers the workpiece upper side 2 substantially completely. The film 4 is shown in FIG. 1 as being transparent and partially broken away merely for the purpose of better illustration.

In addition, FIG. 1 shows a suction element 5, which is carried by a manipulator arm 6 and can be connected to a vacuum generator 7. The suction element 5 and the manipulator arm 6 are parts of a mechanical arrangement which will be described in detail hereinafter.

As illustrated schematically in FIG. 1, first the perforated metal sheet 1 is provided with the film 4. Then, the suction element 5 and the perforated metal sheet 1 provided with the film 4 are placed against each other to form a suction chamber 8. A vacuum is then generated in the suction chamber 8 by means of the vacuum generator 7. The film 4 prevents air from flowing into the suction chamber 8 through the through-openings 3 opening into the suction chamber 8. As a result, it is possible to form a vacuum by means of which the suction element 5 and the perforated metal sheet 1 are fixed to each other with a holding force. The holding force is sufficient to hold the perforated metal sheet 1 on the suction element 5 during subsequent manipulation.

Figure 2A:
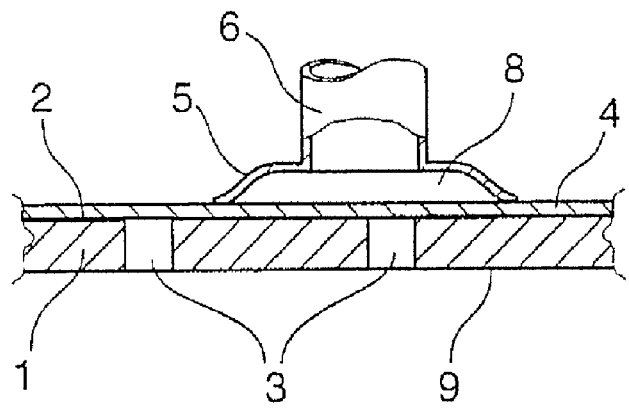
FIGS. 2a to 2c show schematic sections of a workpiece and a suction element fixed to each other.

FIG. 2a shows a broken-away section of the perforated metal sheet 1 and the suction element 5 shown in FIG. 1, the section extending along the line I-I indicated in FIG. 1. The through-openings 3 of the perforated metal sheet 1 are provided with a film 4 on the workpiece upper side 2 associated with the suction element 5.

Figure 2B:
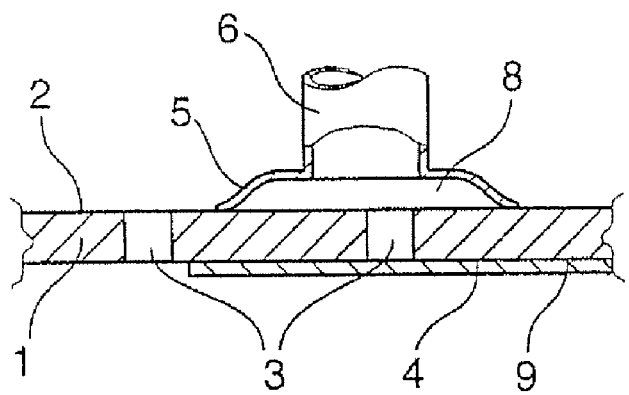

FIG. 2b shows a variant in which the workpiece is provided with a film 4 on the workpiece lower side 9 remote from the suction element 5. In the implementation shown in FIG. 2b, only the through-opening 3 opening into the suction chamber 8 is covered with a film 4. However, the entire lower surface 9 can be covered with film, if desired.

Figure 2C:
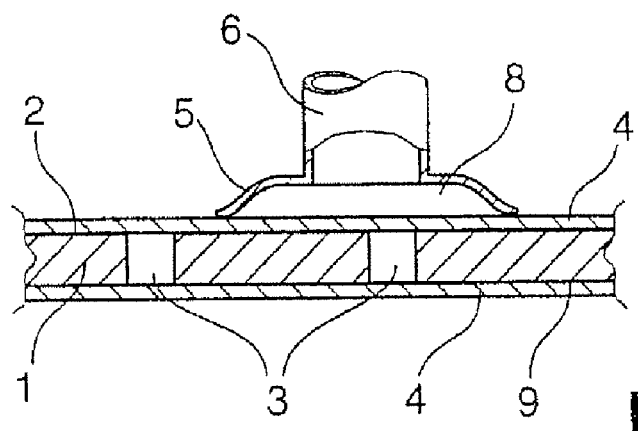

FIG. 2c shows an application where the workpiece is provided with a film 4 on the workpiece upper side 2 and a second film 4 on the workpiece lower side 9.

When, on subsequent manipulation, a perforated metal sheet 1 provided with a film 4 on the workpiece upper side 2 in accordance with FIG. 2a is lifted in the transverse direction of the workpiece upper side 2, it must be ensured that the film 4 is attached to the workpiece sufficiently firmly that the necessary holding force can be transmitted from the film 4 to the workpiece without the film 4 becoming detached. This does not have to be taken into consideration in the same way in the case of a film 4 attached to the workpiece lower side 9 in accordance with FIG. 2b, since in that case the suction element 5 is applied to the workpiece upper side 2 in direct contact with the workpiece. In addition, in that variant, the film 4 is drawn by the vacuum in the suction chamber 8 via the through-openings 3 towards the workpiece. Accordingly, it is even possible for the film 4 to be applied to the workpiece only loosely.

Figure 3:
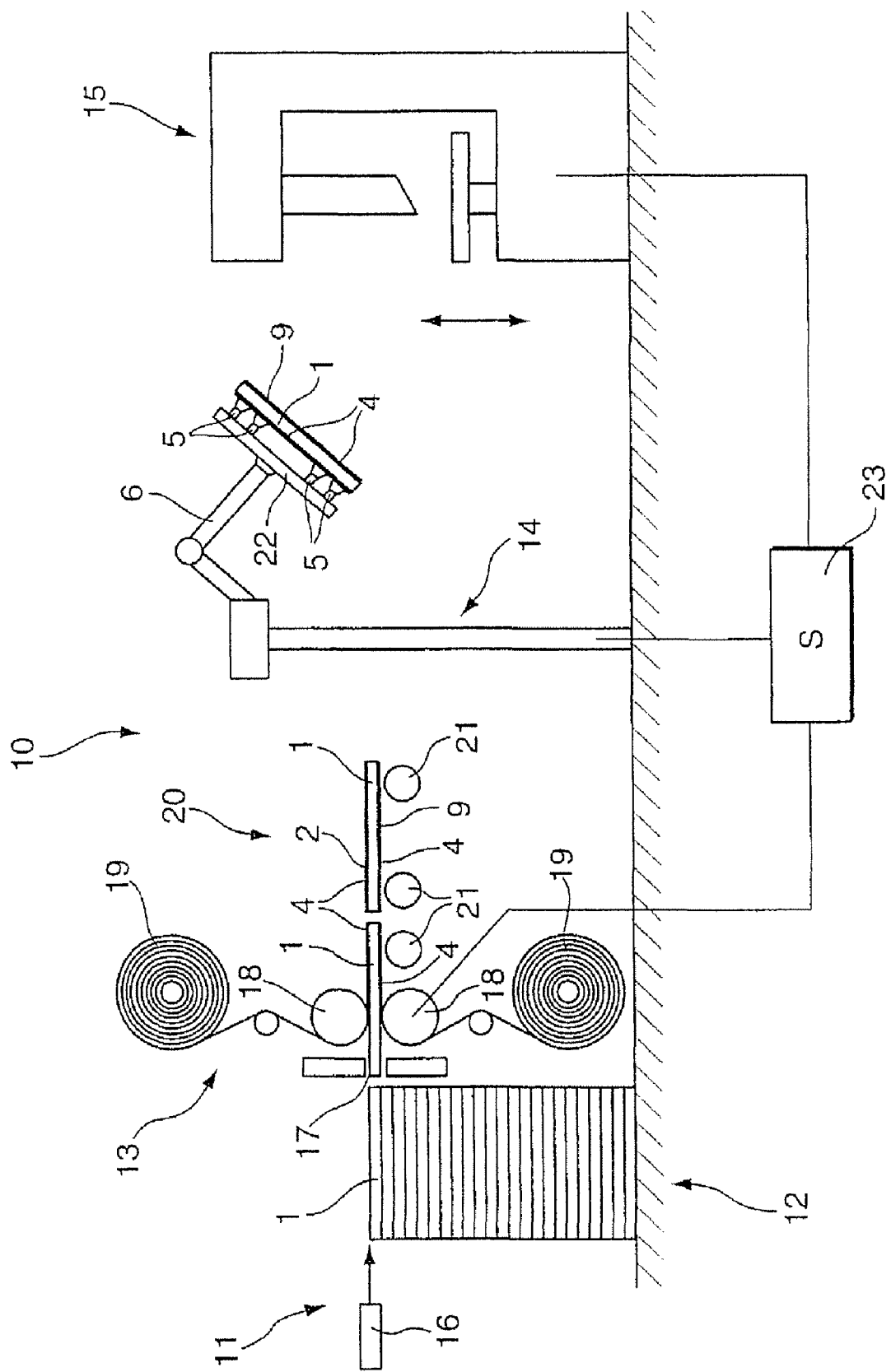
FIG. 3 is a schematic illustration of a first mechanical arrangement for handling a workpiece.

FIG. 3 shows a mechanical arrangement 10 for handling a perforated metal sheet 1. Parts corresponding to parts in FIGS. 1 and 2a to 2c bear the same reference numerals even if they are shown in slightly modified form. The mechanical arrangement 10 comprises a destacking device 11 for destacking perforated metal sheets 1 provided in a stack 12, a covering unit 13, a manipulator 14 and a processing device 15.

The individual steps of the method carried out with the mechanical arrangement 10 shown in FIG. 3 will now be described in detail.

At the start, the perforated metal sheet 1 lying uppermost on the stack 12 is removed from the stack 12 by the destacking device 11. For this, the perforated metal sheet 1 is pushed off the stack 12 by an ejecting cylinder 16 through a gap 17 and into the covering unit 13. The width of the gap 17 is matched to the thickness of the perforated metal sheet 1 in such a way that only a single perforated metal sheet 1 can ever pass through the gap 17.

In the covering unit 13, the perforated metal sheet 1 is provided with a covering. In the illustrative embodiment shown, the covering unit 13 is a film coating unit. In the film coating unit, a self-adhesive, stretchable and highly flexible film 4 of plastics material is drawn by means of pressure rollers 18 from film rolls 19 and pressed by the pressure rollers 18 onto the perforated metal sheet 1. In that operation, the film is adhesively bonded both to the workpiece upper side 2 of the perforated metal sheet 1 and to the workpiece lower side 9 of the perforated metal sheet 1. In some implementations, however, the film is applied only to the workpiece upper side 2 or only to the workpiece lower side 9. The film-coated perforated metal sheets 1 are then taken to a collection position 20. There, they are supported on support rollers 21.

In the illustrative embodiment shown in FIG. 3, a plurality of suction elements 5 are attached to a suction element plate 22 on the manipulator arm 6. In the collection position 20, the suction elements 5 are brought into contact with the perforated metal sheet 1. For that purpose, the suction elements 5 on the suction element plate 22 are swung into a suitable position by means of the manipulator 14 and lowered onto the perforated metal sheet 1. Once a vacuum has been generated in the suction chambers 8 of the suction elements 5 by means of the vacuum generator 7, not shown in FIG. 3, of the mechanical arrangement 10, the perforated metal sheet 1 is fixed to the suction elements 5 with a holding force. The fixed perforated metal sheet 1 can then be fed to the processing device 15. It is possible in this case for the fixed perforated metal sheet 1 not only to be fed to the processing device 15 but also to be held and positioned by means of the manipulator 14 during processing.

To enable fully automatic operation of the mechanical arrangement 10, a numerical control unit 23 is provided which provides for coordinated operation of the various units.

If the processing device 15 is a bending unit or a cutting unit, for example, the film 4 may provide further advantages. A problem that frequently occurs in the processing of workpieces by bending units or cutting units is that undesirable scratches or impressions are made on the workpiece by the processing tools or other parts of the machine. By virtue of the covering joined to the workpiece, processing can be carried out while taking care of the material, since the covering protects the workpiece from scratches and impressions.

As a departure from the mechanical arrangement 10 illustrated in FIG. 3, a covering unit 13 may also be arranged in such a way that a workpiece surface disposed outwardly on a stack (e.g., the upper surface of the top workpiece) can be provided with a covering without it being necessary for the workpiece to be removed from the stack beforehand. Once the workpiece that has been provided with the covering in the stack and the suction elements of a manipulator have been fixed to each other, the workpiece may be lifted off the stack by means of the manipulator for subsequent manipulation.

After processing of the workpiece, the covering can be removed from the workpiece. This may be done manually by an operator or may also be carried out in an automated manner by means of a removal unit of the mechanical arrangement.

A second mechanical arrangement 24 for handling a perforated metal sheet 1 is illustrated in FIG. 4. Parts that correspond to parts in FIGS. 1, 2a to 2c and 3 bear the same reference numerals even if they are shown in slightly modified form. The mechanical arrangement 24 comprises a feed device 25, for example a feed device arranged downstream of a punching machine, for feeding perforated metal sheets 1, a stacking device 26 for stacking the perforated metal sheets 1, a manipulator 14 and a processing device 15. The stacking device 26 has a depositing device 27 for depositing the fed perforated metal sheets 1 on the stack 12, a stack 28 of paper liners 29 serving as coverings, which is arranged beside the stack 12 of perforated metal sheets 1, and a pushing device 30 with a driven roller 31 for moving the uppermost paper liner 29 onto the stack 12.

The sequence of the method for handling a workpiece with the mechanical arrangement 24 shown in FIG. 4 will now be described in detail. First, the perforated metal sheets 1 are fed by means of the feed device 25 to the stacking device 26. In the stacking device 26, the perforated metal sheets 1 are deposited on the stack 12 alternately with the paper liners 29 so that a paper liner 29 will be in contact with the underside of each perforated metal sheet. The perforated metal sheet 1 that is uppermost on the stack 12 and the suction elements 5 are brought into contact with each other. Once a vacuum has been generated in the suction chambers 8 of the suction elements 5 by means of the vacuum generator 7, not shown in FIG. 4, of the mechanical arrangement 24, the perforated metal sheet 1 is fixed to the suction elements 5 with a holding force. At least one through-opening 3 of the perforated metal sheet 1 is at least partially provided with the paper liner 29 resting against the underside of the perforated metal sheet. Owing to the vacuum, the paper liner 29 is held against the perforated metal sheet 1, thereby ensuring that the vacuum is also maintained during subsequent manipulation of the perforated metal sheet 1.

As in the case of the mechanical arrangement 10 shown in FIG. 3, a numerical control unit 23 providing for coordinated operation of the various units is also provided in the mechanical arrangement 24 shown in FIG. 4.

Other embodiments are within the scope of the following claims.

What is claimed is:

1. A method for handling a workpiece having at least one through-opening and being provided as one of a plurality of workpieces in a stack, the method comprising:
   providing at least one through-opening of the workpiece with a covering prior to, during, or after removal of the workpiece from the stack;
   placing at least one suction element and the workpiece against each other to form a suction chamber;
   drawing a vacuum in the suction chamber to fix the workpiece and the suction element to each other with a holding force for subsequent manipulation of the workpiece;
   wherein the covering is configured to reduce the flow of air through the through-opening to the suction chamber sufficiently so that the vacuum gives rise to the holding force; and
   feeding the workpiece to a processing device that comprises a bending device or a cutting device, after the workpiece and the suction element have been fixed to each other with the holding force.

2. A method according to claim 1 wherein the workpiece comprises a perforated metal sheet.

3. A method according to claim 1, wherein providing the covering comprises detachably joining the covering to the workpiece.

4. A method according to claim 1, wherein the covering is substantially planar.

5. A method according to claim 1, wherein providing the covering comprises covering at least one side of the workpiece substantially completely with the covering.

6. A method according to claim 1, further comprising placing the suction element and the workpiece that is disposed in the stack against each other after at least one through-opening of the workpiece has been at least partially provided with a covering.

7. A system for handling a workpiece having at least one through-opening, the system comprising:
   a destacking device for removing the workpiece from a stack;
   a covering unit associated with the destacking device;
   a suction element configured to form a suction chamber when placed against the workpiece;
   a vacuum generator configured to draw a vacuum in the suction chamber to fix the workpiece and the suction element to each other with a holding force for subsequent manipulation of the workpiece;
   wherein the covering unit is configured to apply a covering to the workpiece before, during, or after the workpiece is removed from the stack by the destacking device to at least partially cover the at least one through-opening to reduce the flow of air through the through-opening to the suction chamber sufficiently so that the vacuum gives rise to the holding force; and
   a numerical control unit configured to provide coordinated control to the system.

8. A method according to claim 4, wherein the workpiece is substantially planar.

9. A method according to claim 4, wherein the covering comprises a film.

10. A system according to claim 7, wherein the covering unit comprises a film coating unit.

11. A system according to claim 7, wherein the device further comprises a stacking unit configured to stack a plurality of workpieces, and the covering unit is configured to interpose coverings between adjacent workpieces during stacking.

12. A system according to claim 7, comprising a plurality of suction elements.

13. A system according to claim 7, further comprising a manipulator arm on which the suction element is mounted.

14. A method according to claim 6 wherein providing the covering comprises alternating workpieces with coverings in the stack.

* * * * *